(12) United States Patent
Lee

(10) Patent No.: US 11,200,163 B2
(45) Date of Patent: Dec. 14, 2021

(54) CONTROLLER AND METHOD OF OPERATING THE SAME

(71) Applicant: SK hynix Inc., Gyeonggi-do (KR)

(72) Inventor: Joo Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/899,164

(22) Filed: Jun. 11, 2020

(65) Prior Publication Data

US 2021/0109853 A1   Apr. 15, 2021

(30) Foreign Application Priority Data

Oct. 14, 2019  (KR) .......................... 10-2019-0127206

(51) Int. Cl.
*G06F 12/02* (2006.01)
*G06F 12/1045* (2016.01)
*G06F 9/50* (2006.01)
*G06F 13/16* (2006.01)

(52) U.S. Cl.
CPC .......... *G06F 12/0246* (2013.01); *G06F 9/505* (2013.01); *G06F 12/1045* (2013.01); *G06F 13/1668* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 10,970,230 B2 * | 4/2021 | Byun | .................. G06F 12/0873 |
| 2012/0110239 A1 * | 5/2012 | Goss | .................. G06F 12/0246 711/103 |
| 2020/0142744 A1 * | 5/2020 | Tolstsikau | ............. G06F 9/5016 |
| 2021/0034242 A1 * | 2/2021 | Dalmatov | ............. G06F 3/0611 |

FOREIGN PATENT DOCUMENTS

KR    10-1555022    9/2015

* cited by examiner

*Primary Examiner* — Kevin Verbrugge
(74) *Attorney, Agent, or Firm* — IP & T Group LLP

(57) ABSTRACT

Provided herein may be a controller and a method of operating the controller. The controller may include a central processing unit configured to generate a command, manage a logical address using a notation system, a radix of which is greater than that of a binary notation system, and output the command and the logical address, and a flash interface layer configured to queue the command depending on workloads of dies, translate the logical address into a physical address, and output the command and the physical address through a selected channel.

14 Claims, 7 Drawing Sheets

CONTROLLER AND METHOD OF OPERATING THE SAME

CROSS-REFERENCE TO RELATED APPLICATION

The present application claims priority under 35 U.S.C. § 119(a) to Korean patent application number 10-2019-0127206, filed on Oct. 14, 2019, which is incorporated herein by reference in its entirety.

BACKGROUND

1. Technical Field

Various embodiments of the present disclosure relate to a controller and a method of operating the controller, and more particularly, to a controller that translates a logical address into a physical address and a method of operating the controller.

2. Related Art

A memory system may include a storage device and a controller.

A memory device may include a plurality of dies, each of which may include a plurality of memory cells in which data is stored. The memory device may be implemented as a volatile memory device in which stored data is lost when the supply of power is interrupted or as a nonvolatile memory device in which stored data is retained even when the supply of power is interrupted. Recently, with an increase in the use of portable electronic devices, such as mobile phones and notebook computers, flash memory devices have been widely used as nonvolatile memory devices.

The controller may control data communication between a host and the memory device. For example, the controller may control the memory device in response to a request received from the host. Further, the controller may also perform a background operation for improving the performance of the memory system even when a request is not received from the host.

The host may communicate with the memory device through the controller using an interface protocol, such as Peripheral Component Interconnect-Express (PCI-E), Advanced Technology Attachment (ATA), Serial ATA (SATA), Parallel ATA (PATA) or Serial Attached SCSI (SAS). Interface protocols between the host and the memory system are not limited to the above-described examples, and may include various other interfaces, such as Universal Serial Bus (USB), Multi-Media Card (MMC), Enhanced Small Disk Interface (ESDI), or Integrated Drive Electronics (IDE).

SUMMARY

Various embodiments of the present disclosure are directed to a controller that is capable of reducing the workload of a flash translation layer by changing an address translation method for the flash translation layer, and a method of operating the controller.

An embodiment of the present disclosure is directed to a controller. The controller may include a central processing unit configured to generate a command, manage a logical address using a notation system, a radix of which is greater than that of a binary notation system, and output the command and the logical address, and a flash interface layer configured to queue the command depending on workloads of dies, translate the logical address into a physical address, and output the command and the physical address through a selected channel.

Another embodiment of the present disclosure is directed to a controller. The controller may include a flash translation layer configured to select a channel of a plurality of channels in consideration of workloads of the plurality of channels, manage logical addresses of memory blocks included in a plurality of dies coupled to the selected channel, the logical addresses being represented in a hexadecimal notation system and arranged in ascending order, translate the logical address represented in the hexadecimal notation system into the logical address represented in a binary notation system, and output the logical address of the binary notation system, and a flash interface layer configured to translate the logical address represented in the binary notation system into the logical address of the hexadecimal notation system, generate a physical address of a selected die and memory block based on the logical address represented in the hexadecimal notation system, and output the physical address through the selected channel.

Still another embodiment of the present disclosure is directed to a method of operating a controller. The method may include managing addresses of memory blocks included in a plurality of dies, the addresses being represented in a hexadecimal notation system, generating a logical address of the address corresponding to a selected one of the memory blocks within a selected one of the dies, translating the logical address into the logical address represented in the hexadecimal notation system, and generating a physical address based on the logical address represented in the hexadecimal notation system, the physical address indicating the selected memory block within the selected die, and accessing the selected memory block within the selected die according to the physical address.

DETAILED DESCRIPTION

Figure 1:
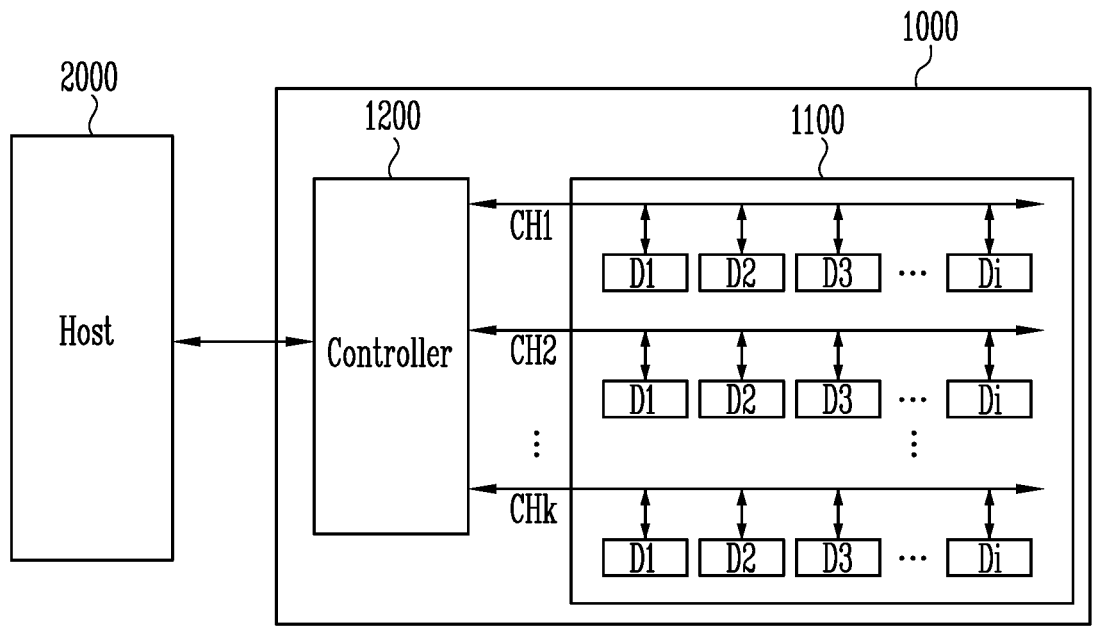
FIG. 1 is a diagram illustrating a memory system according to an embodiment of the present disclosure.

FIG. 1 is a diagram illustrating a memory system according to an embodiment of the present disclosure.

Referring to FIG. 1, a memory system 1000 may include a memory device 1100 which stores data, and a controller 1200 which performs communication between the memory device 1100 and a host 2000.

The memory device 1100 may include a plurality of dies D1 to Di (where i is a positive integer greater than 1). For example, each of the dies D1 to Di may be implemented as a volatile memory device in which stored data is lost when the supply of power is interrupted or as a nonvolatile memory device in which stored data is retained even when the supply of power is interrupted. By way of example, the following embodiments are illustrated and described in the context in which the dies D1 to Di are implemented as nonvolatile memory devices. Such a nonvolatile memory device may be a NAND flash memory device.

The dies D1 to Di may be coupled to the controller 1200 through a plurality of channels CH1 to CHk (where k is a positive integer greater than 1). For example, first to i-th dies D1 to Di may be coupled to the first channel CH1, first to i-th dies D1 to Di may be coupled to the second channel CH2, and first to i-th dies D1 to Di may be coupled to the k-th channel CHk. The first to i-th dies D1 to Di coupled to one channel may be physically different than the dies D1 to Di coupled to a different channel. For example, the dies coupled to CH1 may be physically different from the correspondingly identified dies coupled to CH2. In the case in which dies D1 to Di coupled to one channel are different than the dies D1 to Di coupled to another channel, the physical addresses of correspondingly identified dies are different from each other.

The controller 1200 may perform communication between the host 2000 and the memory device 1100. For example, the controller 1200 may access the memory device 1100 in response to a request from the host 2000, or may access the memory device 1100 to perform a background operation. When the controller 1200 is coupled to the memory device 1100 through a single channel, a channel address is not required. However, as illustrated in FIG. 1, in the multi-channel memory system 1000, the controller 1200 and the memory device 1100 are coupled to each other through a plurality of channels, and thus channel addresses are required in order to access the memory device.

That is, in order for the controller 1200 to access a selected memory block, a channel address, a die address, and a memory block address are required. The addresses are managed by the flash translation layer of the controller 1200; detailed description of the function of the flash translation layer is provided below.

The host 2000 may generate requests RQ for various operations, and may output the generated requests RQ to the memory system 1000. For example, the requests RQ may include a program request for controlling a program operation, a read request for controlling a read operation, an erase request for controlling an erase operation, etc. The host 2000 may communicate with the memory system 1000 through various interfaces, such as Peripheral Component Interconnect Express (PCIe), Advanced Technology Attachment (ATA), Serial ATA (SATA), Parallel ATA (PATA), serial attached SCSI (SAS), Non-Volatile Memory Express (NVMe), Universal Serial Bus (USB), Multi-Media Card (MMC), Enhanced Small Disk Interface (ESDI), or Integrated Drive Electronics (IDE).

Figure 2:
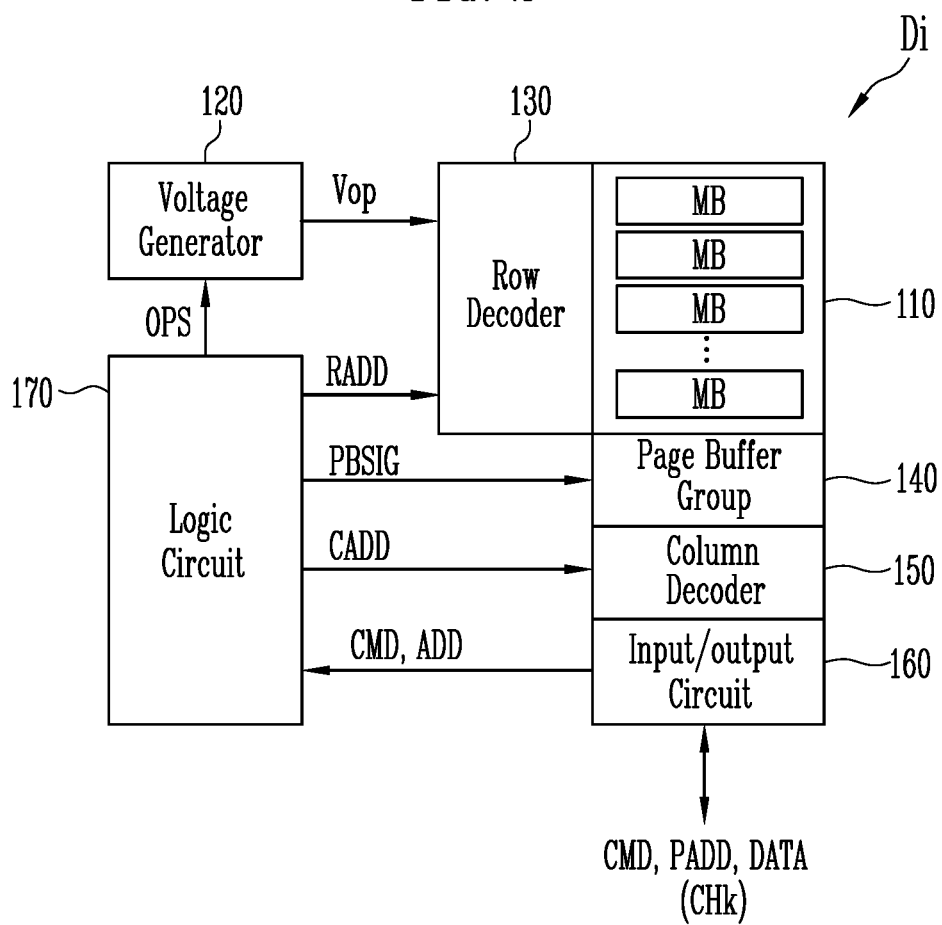
FIG. 2 is a diagram illustrating in detail a representative one of a plurality of dies illustrated in FIG. 1.

FIG. 2 is a diagram illustrating in detail a representative one of a plurality of dies illustrated in FIG. 1.

Referring to FIG. 2, an i-th die Di may include a memory cell array 110 which stores data, a peripheral circuit that includes components 120, 130, 140, 150 and 160 (described below) which collectively perform a program, read or erase operation. Die Di may further include control logic 170 which controls the peripheral circuit.

The memory cell array 110 may include a plurality of memory blocks which store data. Each of the memory blocks may include a plurality of memory cells, which may be implemented in a two-dimensional (2D) structure in which memory cells are horizontally arranged on a substrate, or a three-dimensional (3D) structure in which memory cells are vertically stacked on a substrate.

The peripheral circuit may include a voltage generator 120, a row decoder 130, a page buffer group 140, a column decoder 150, and an input/output circuit 160.

The voltage generator 120 may generate and output operating voltages Vop required for various operations in response to an operation signal OPS. For example, the voltage generator 120 may generate and output the operating voltages Vop, such as a program voltage, a verify voltage, a read voltage, a pass voltage, and an erase voltage.

The row decoder 130 may select a single memory block among the memory blocks in the memory cell array 110 in response to a row address RADD transfer operating voltages Vop, and may transmit the operating voltages Vop through local lines coupled to the selected memory block.

The page buffer group 140 may include a plurality of page buffers coupled to the bit lines, and may temporarily store data in response to a page buffer control signal PBSIG during a program or read operation. Each of the page buffers may include a plurality of latches which temporarily store data during a program, read or verify operation.

The column decoder 150 may transfer data received from the input/output circuit 160 to the page buffer group 140 in response to a column address CADD during a program operation, or may transfer data received from the page buffer group 140 to the input/output circuit 160 during a read operation.

The input/output circuit 160 may be coupled to a controller (e.g., 1200 of FIG. 1) through input/output lines included in the corresponding channel, and may then input/output a command CMD, an address ADD, and data DATA. For example, the input/output circuit 160 may transmit the command CMD and the address ADD, received from the controller 1200, to the control logic 170, and may transmit the data DATA to the column decoder 150. The address ADD that is input to the input/output circuit 160 of the i-th die Di may be a physical address output from the controller 1200. The input/output circuit 160 may output the data DATA, received from the column decoder 150, to the controller 1200 through input/output lines during a read operation.

The control logic 170 may control the peripheral circuit (or components thereof) in response to the command CMD and the address ADD that are received through the input/output circuit 160. The control logic 170 may generate the operation signal OPS and the page buffer control signal PBSIG in response to the command CMD, and may generate a row address RADD and a column address CADD in response to the address ADD.

Figure 3:
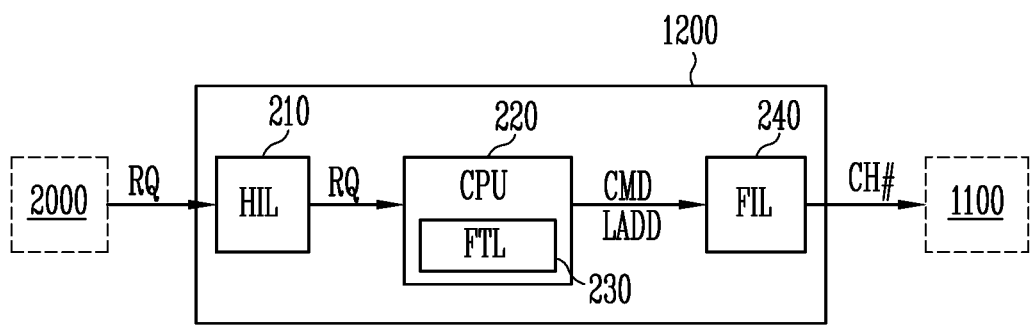
FIG. 3 is a diagram illustrating in detail a controller according to an embodiment of the present disclosure.

FIG. 3 is a diagram illustrating in detail a controller according to an embodiment of the present disclosure.

Referring to FIG. 3, the controller 1200 may include a host interface layer (HIL) 210, a central processing unit (CPU) 220, and a flash interface layer (FIL) 240. In addition to the components illustrated in FIG. 3, the controller 1200 may further include other components, e.g., an error correction component, a buffer, etc.

The host interface layer 210 may perform communication between a host 2000 and the controller 1200 based on an established protocol. When a request RQ is received from the host 2000, the host interface layer 210 may transmit the received request RQ to the central processing unit 220. In addition to the request RQ, the host interface layer 210 may receive data or the like from the host 2000.

The central processing unit 220 may control the overall operation of the controller 1200. The central processing unit 220 may convert the received request RQ into a command CMD that is usable in the memory system 1000, and may output the command CMD. Further, the central processing unit 220 may include a flash translation layer (FTL) 230 which manages addresses.

In the present embodiment, the flash translation layer 230 may generate and output a logical address LADD including information of a die address and a memory block address without translating the logical address into a physical address. For example, the flash translation layer 230 may reduce the number of bits to be calculated by generating logical addresses using a notation system of a greater radix (e.g., the radix 16) than that of a binary notation system, which has radix 2.

Further, the flash translation layer 230 according to the present embodiment may reduce the workload of the flash translation layer 230 by omitting an operation of searching for a physical address mapped to a logical address and by generating and outputting only a logical address.

Figure 4:
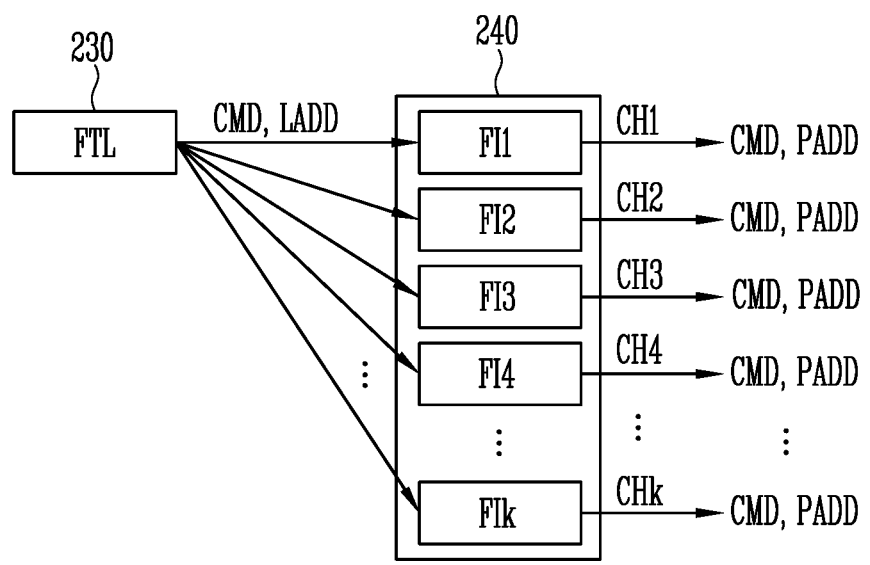
FIG. 4 is a diagram illustrating a communication method between a flash translation layer and flash interfaces according to an embodiment of the present disclosure.

FIG. 4 is a diagram illustrating a communication method between a flash translation layer and flash interfaces according to an embodiment of the present disclosure.

Referring to FIG. 4, the flash translation layer 230 may output a generated command CMD and a generated logical address LADD to the flash interface layer 240, and the flash interface layer 240 may translate the logical address LADD into a physical address PADD and output the command CMD and the physical address PADD to the selected channel. For this operation, the flash interface layer 240 may include first to k-th flash interfaces FI1 to FIk. The number of flash interfaces FI1 to FIk may be identical to the number of channels CH1 to CHk. For example, when the memory device 1100 is coupled to the controller 1200 through CH1 to CHk, the flash interface layer 240 of the controller 1200 may include the FI1 to FIk. That is, FI1 to FIk may be coupled to CH1 to CHk, respectively.

The flash translation layer 230 may select one of FI1 to FIk in consideration of the current workloads of CH1 to CHk, and may output the command CMD and the logical address LADD to the selected flash interface. For example, when the workload of the first channel CH1 is lower than those of other channels, the flash translation layer 230 may transmit the command CMD and the logical address LADD to the first flash interface FI1 coupled to the first channel CH1.

The first flash interface FI1 may translate the received logical address LADD into a physical address PADD, and may output the command CMD and the physical address PADD through the first channel CH1.

In this way, the flash translation layer 230 may sequentially transmit the command CMD and the logical address LADD to the first to k-th flash interfaces FI1 to FIk in consideration of the workloads of channels.

Each of FI1 to FIk may queue the command CMD in consideration of the workloads of dies coupled to the corresponding channel, may translate the logical address LADD into a physical address PADD, and may output the command CMD and the physical address PADD through the corresponding channel.

Figure 5:
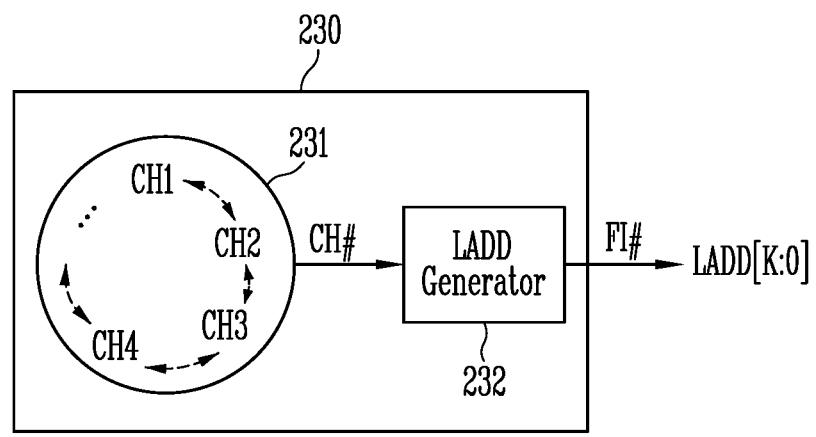
FIG. 5 is a diagram illustrating in detail a flash translation layer according to an embodiment of the present disclosure.

FIG. 5 is a diagram illustrating in detail a flash translation layer according to an embodiment of the present disclosure.

Referring to FIG. 5, the flash translation layer 230 may include a channel manager 231 and a logical address generator (LADD generator) 232.

The channel manager 231 may select a channel CH # in consideration of the workloads of channels. The channel manager 231 may select a channel having a lowest workload from among the channels CH1, CH2, CH3, CH4, . . . , and may generate the address of the selected channel CH #. The channel manager 231 may determine the workloads of the channels CH1, CH2, CH3, CH4, . . . in various ways.

For example, the channel manager 231 may determine the workloads depending on commands loaded into the channels CH1, CH2, CH3, CH4, . . . . Workloads may differ from each other depending on commands in the respective channels, and the workload of a channel may be calculated by adding the workloads of commands loaded into the channel. Therefore, when a command loaded into the channel is executed, the workload of the corresponding channel may be reduced by the workload of the terminated command CMD.

Alternatively, the channel manager 231 may determine the workload depending on the amount of data loaded into the channel, and may also determine the workload in consideration of both the commands and the amount of data.

In this way, the channel manager 231 may monitor the workloads of channels, select a channel having a workload lower than those of other channels, and generate the address of the selected channel CH #.

The logical address generator 232 may generate a logical address LADD, and may output the logical address LADD to a flash interface FI # corresponding to the address of the selected channel CH #. The logical address generator 232 may generate a logical address LADD including a die address and a block address. For example, the logical address generator 232 may manage the die address and the block address according to the hexadecimal notation system, the radix 16 of which is greater than the radix 2 of the binary notation system, and may output a logical address translated into a binary code [K:0] when outputting the logical address. A detailed method of generating the die address and the block address in the hexadecimal notation system is described below with reference to FIG. 7.

Figure 6:
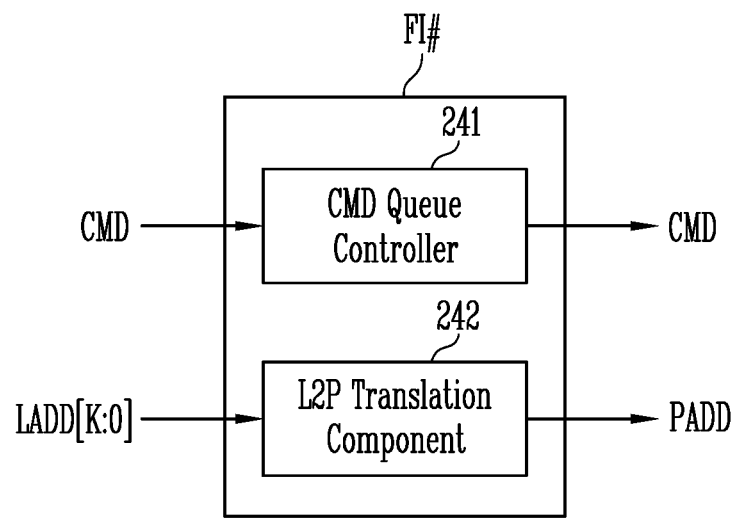
FIG. 6 is a diagram illustrating in detail a flash interface according to an embodiment of the present disclosure.

FIG. 6 is a diagram illustrating in detail a flash interface according to an embodiment of the present disclosure.

Referring to FIG. 6, a flash interface FI # may include a command (CMD) queue controller 241 and a logical to physical (L2P) translation component 242.

The command queue controller 241 may receive a command CMD from the central processing unit 220, and may queue the command CMD in consideration of the workloads of respective dies coupled to the corresponding channel.

The L2P translation component 242 may receive the logical address LADD from the flash translation layer 230, translate the received logical address LADD into a physical address PADD, and output the physical address PADD.

Figure 7:
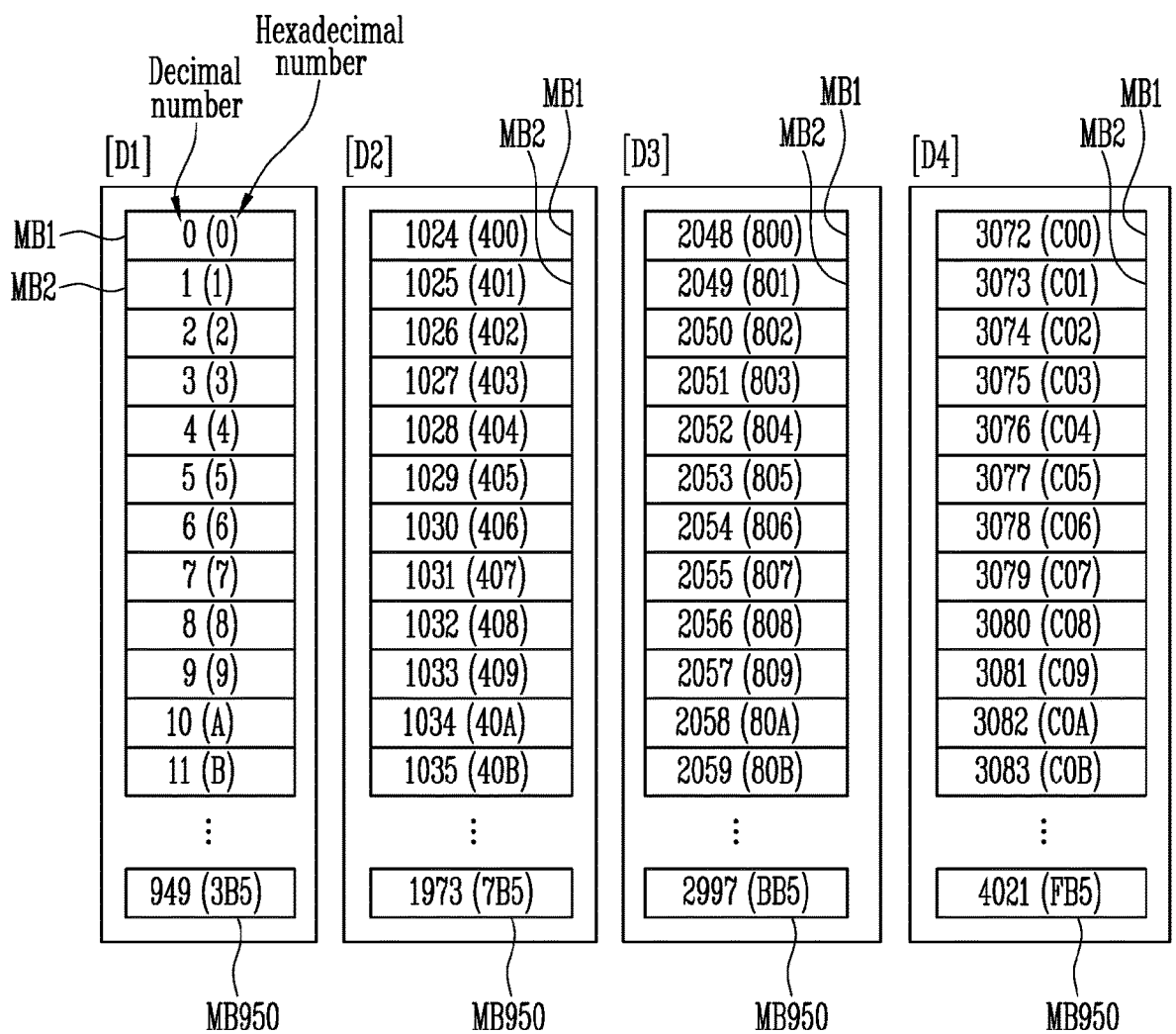
FIG. 7 is a diagram illustrating a logical address generation method according to an embodiment of the present disclosure.

FIG. 7 is a diagram illustrating a logical address generation method according to an embodiment of the present disclosure.

Referring to FIG. 7, a logical address may include a die address and a block address. For this operation, logical addresses of all memory blocks in all dies coupled to the same channel may be expressed as hexadecimal numbers in the hexadecimal notation system and arranged in ascending order.

A case where first to fourth dies D1 to D4 are coupled to one channel and where 950 memory blocks MB are included in each of the first to fourth dies D1 to D4 is assumed in the following description.

When the first memory block MB1 of the first die D1 is represented by a decimal number, it is '0', and when the first memory block MB1 is represented by a hexadecimal logical address, it is '0'. Numbers in parentheses in FIG. 7 denote logical addresses in a hexadecimal number form. When the second memory block MB2 of the first die D1 is represented by a decimal number, it is '1', and when the second memory block MB2 is represented by a hexadecimal logical address, it is '1'. When the 950-th memory block MB950 of the first die D1 is represented by a decimal number, it is '949', and when the 950-th memory block MB950 is represented by a hexadecimal logical address, it is '3B5'.

When the first memory block MB1 of the second die D2 is represented by a decimal number, it is '1024', and when the first memory block MB1 is represented by a hexadecimal logical address, it is '400'. When the second memory block MB2 of the second die D2 is represented by a decimal number, it is '1025', and when the second memory block MB2 is represented by a hexadecimal logical address, it is '401'. When the 950-th memory block MB950 of the second die D2 is represented by a decimal number, it is '1973', and when the 950-th memory block MB950 is represented by a hexadecimal logical address, it is '7B5'.

When the first memory block MB1 of the third die D3 is represented by a decimal number, it is '2048', and when the first memory block MB1 is represented by a hexadecimal logical address, it is '800'. When the second memory block MB2 of the third die D3 is represented by a decimal number, it is '2049', and when the second memory block MB2 is represented by a hexadecimal logical address, it is '801'. When the 950-th memory block MB950 of the third die D3 is represented by a decimal number, it is '2997', and when the 950-th memory block MB950 is represented by a hexadecimal logical address, it is 'BB5'.

When the first memory block MB1 of the fourth die D4 is represented by a decimal number, it is '3072', and when the first memory block MB1 is represented by a hexadecimal logical address, it is 'C00'. When the second memory block MB2 of the fourth die D4 is represented by a decimal number, it is '3073', and when the second memory block MB2 is represented by a hexadecimal logical address, it is 'C01'. When the 950-th memory block MB950 of the fourth die D4 is represented by a decimal number, it is '4021', and when the 950-th memory block MB950 is represented by a hexadecimal logical address, it is 'FB5'.

Such a logical address may be generated by a logical address generator (e.g., 232 of FIG. 5), and a L2P translation component (e.g., 242 of FIG. 6) may determine the addresses of a die and a memory block depending on the logical address generated by the logical address generator 232, and then output a physical address PADD.

As described above, since different logical addresses are assigned to different memory blocks included in the first to fourth dies D1 to D4, the flash interface may access the selected memory block using a logical address composed of a smaller number of bits than that of an existing scheme. Since a die address and a memory block address are individually used in the existing scheme, both 'A' bits of the die address and 'B' bits of the memory block address are required in order to access the selected memory block. That is, although the conventional scheme requires 'A+B' bits for the addresses of a die and a memory block, embodiments of the present invention may identify a die and a memory block using only a hexadecimal logical address, and thus a logical address may be represented by a number of bits less than 'A+B' bits. Although a method of generating a hexadecimal logical address has been described, the present invention is not limited to this particular way of representation. A logical address may be represented by a number of bits corresponding to a hexadecimal number, or may be represented by more bits depending on the number of channels, dies, and memory blocks.

Figure 8:
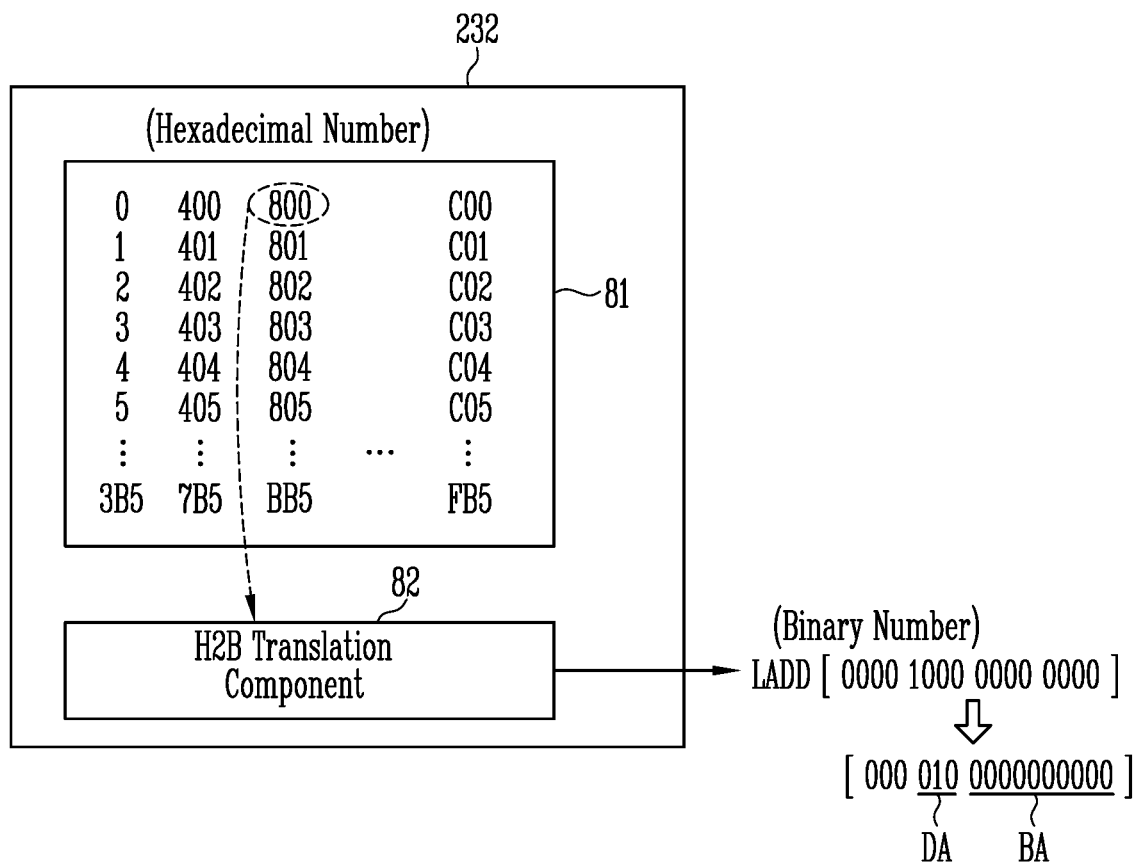
FIG. 8 is a diagram illustrating in detail a logical address generator according to an embodiment of the present disclosure.

FIG. 8 is a diagram illustrating in detail a logical address generator according to an embodiment of the present disclosure.

Referring to FIG. 8, the logical address generator 232 may include a hexadecimal number table 81 and a hexadecimal number to binary number (H2B) translation component 82.

The hexadecimal number table 81 may manage the addresses of memory blocks as values of hexadecimal numbers, allocate a memory block, or transmit a hexadecimal number corresponding to the address received from the host to the H2B translation component 82. The hexadecimal numbers may differ from each other depending on the numbers of dies and memory blocks included in the memory system. For example, the hexadecimal numbers of memory blocks included in the same die continuously increase from a first memory block, and a hexadecimal number of a first memory block included in a next die may have a hexadecimal number discontinuously increasing from a hexadecimal number of a last memory block in a previous die. That is, the logical addresses in the hexadecimal notation system continuously increase from a first-located memory block within a given die, and the logical address of a first-located memory block in a next die discontinuously increases from the logical address of a last-located memory block in a previous die.

The H2B translation component 82 may translate the received hexadecimal number into a binary code, and may then output a logical address LADD. For example, when an address having a hexadecimal number of '800' is selected from the hexadecimal number table 81, the H2B translation component 82 may translate the hexadecimal number of '800' into a binary number of '1000 0000 0000'. Here, the H2B translation component 82 may add 4 additional bits of '0000' to the translated binary number, and may then output a logical address LADD having a total of 16 bits. For example, when the logical address LADD is generated as '0000 1000 0000 0000', '000' corresponding to [15:13] bits, among the bits, may be classified as reserved bits, '010' corresponding to [12:10] bits may be classified as a die address DA, and '0000000000' corresponding to the remaining [9:0] bits may be classified as a block address BA. That is, when the logical address LADD is divided according to the address, it may be '000 010 0000000000', and may be classified into reserved bits, a die address, and a block address depending on the [15:0] bits. In other embodiments, in the case of a hexadecimal number of 'BB5', the H2B translation component 82 may translate 'BB5' into a binary number of '1011 1011 0101', add 4 additional bits 0000 thereto, and output a logical address LADD of '000 010 1110110101'. Here, '010' may be classified as a die address DA, and '1110110101' may be classified as a block address BA.

Figure 9:
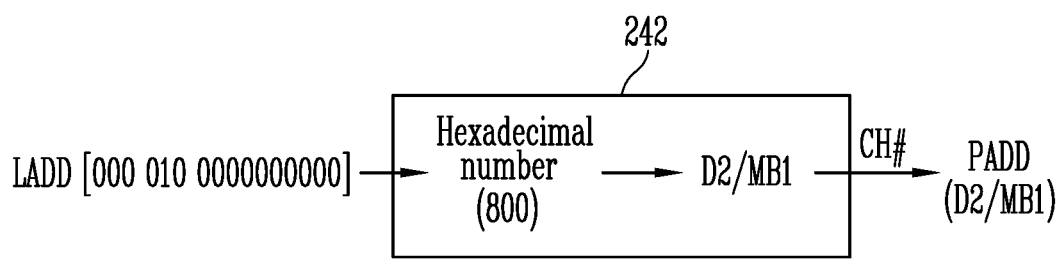
FIG. 9 is a diagram illustrating in detail logical to physical (L2P) translation component according to an embodiment of the present disclosure.

FIG. 9 is a diagram illustrating in detail an L2P translation component according to an embodiment of the present disclosure.

Referring to FIG. 9, the L2P translation component 242 may receive a logical address LADD output from a logical address generator 232, translate the received logical address LADD into a hexadecimal number, and then generate a physical address PADD of a die and a memory block based on the hexadecimal number.

For example, when a logical address LADD of a binary value '0000100000000000' is received, the L2P translation component 242 may translate the binary value of '0000100000000000' into a hexadecimal value of '800', and may generate a physical address PADD corresponding to a first memory block MB1 of a second die D2 corresponding to the hexadecimal value '800'. Through the above-described scheme, the L2P translation component 242 may output the physical address PADD through the channel CH # coupled to the L2P translation component 242.

Figure 10:
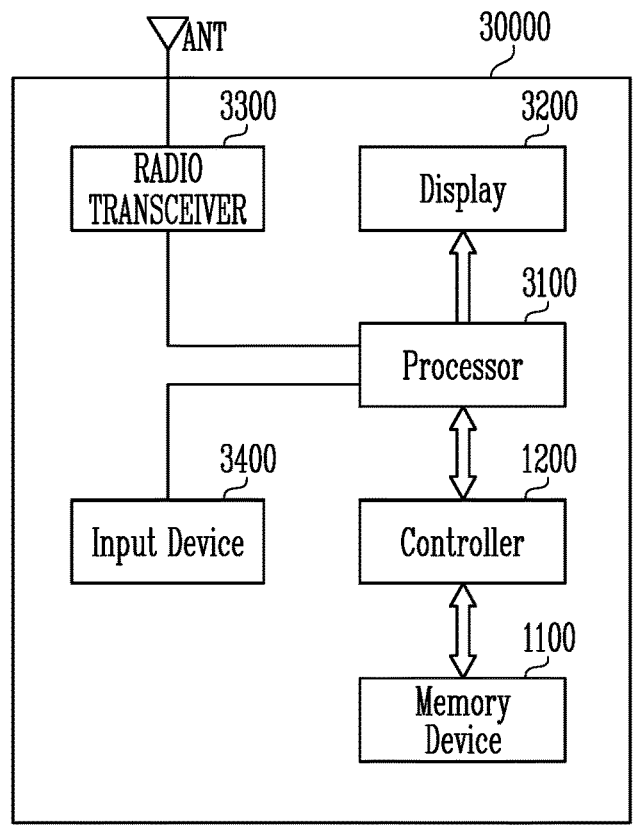
FIG. 10 is a diagram illustrating a memory system including a controller according to an embodiment of the present disclosure.

FIG. 10 is a diagram illustrating a memory system including a controller according to an embodiment of the present disclosure.

Referring to FIG. 10, a memory system 30000 may be implemented as a cellular phone, a smart phone, a tablet PC, a personal digital assistant (PDA) or a wireless communication device. The memory system 30000 may include a memory device 1100 and a controller 1200, which is capable of controlling the operation of the memory device 1100.

The controller 1200 may control a data access operation for the memory device 1100, for example, a program operation, an erase operation or a read operation, under the control of a processor 3100. When accessing the memory device 1100, the controller 1200 according to the present embodiment may generate a physical address using a logical address, which is a hexadecimal number of the hexadecimal notation system, and may access the memory device 1100 based on the generated physical address.

Data programmed to the memory device 1100 may be output via a display 3200 under the control of the controller 1200.

A radio transceiver 3300 may exchange radio signals through an antenna ANT. For example, the radio transceiver 3300 may convert radio signals received through the antenna ANT into signals that may be processed by the processor 3100. Therefore, the processor 3100 may process the signals output from the radio transceiver 3300, and may transmit the processed signals to the controller 1200 or the display 3200. The controller 1200 may transmit the signals processed by the processor 3100 to the memory device 1100. Further, the radio transceiver 3300 may convert signals output from the processor 3100 into radio signals, and output the radio signals to an external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 so that data output from the controller 1200, data output from the radio transceiver 3300, or data output from the input device 3400 is output via the display 3200.

In an embodiment, the controller 1200 capable of controlling the operation of the memory device 1100 may be implemented as a part of the processor 3100 or as a chip provided separately from the processor 3100.

Figure 11:
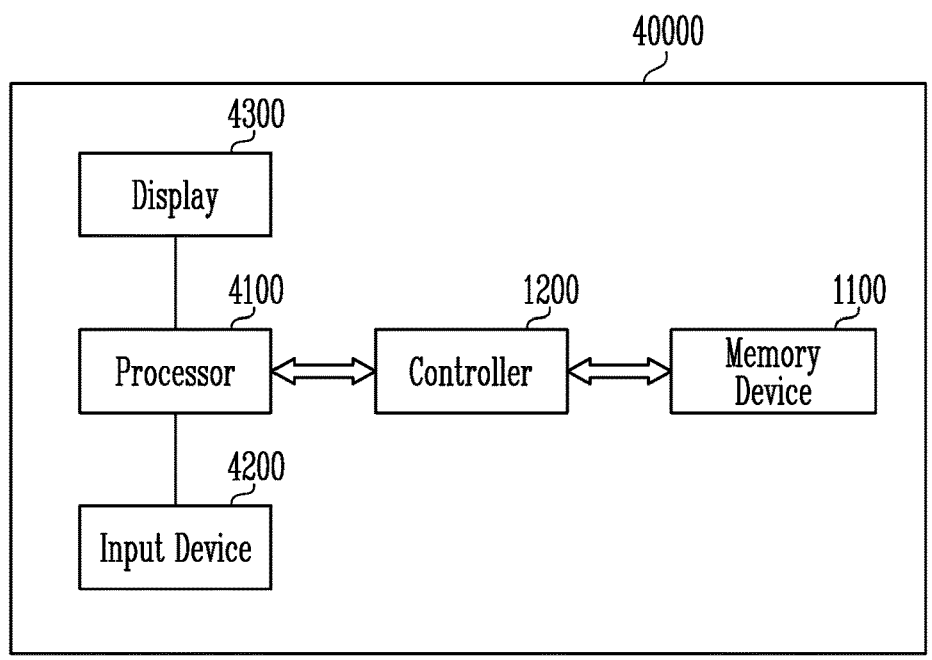
FIG. 11 is a diagram illustrating a memory system including a controller according to an embodiment of the present disclosure.

FIG. 11 is a diagram illustrating a memory system including a controller according to an embodiment of the present disclosure.

Referring to FIG. 11, a memory system 40000 may be embodied in a personal computer, a tablet PC, a net-book, an e-reader, a personal digital assistant (PDA), a portable multimedia player (PMP), an MP3 player, or an MP4 player.

The memory system 40000 may include a memory device 1100 which stores data, and a controller 1200 which is capable of controlling a data processing operation of the memory device 1100.

Further, a processor 4100 may output data, stored in the memory device 1100, via a display 4300 according to data input through an input device 4200. For example, the input device 4200 may be implemented as a pointing device such as a touch pad or a computer mouse, a keypad or a keyboard.

The processor 4100 may control the overall operation of the memory system 40000, and may control the operation of the controller 1200. In an embodiment, the controller 1200 capable of controlling the operation of the memory device 1100 may be implemented as a part of the processor 4100 or as a chip provided separately from the processor 4100.

When accessing the memory device 1100, the controller 1200 according to the present embodiment may generate a physical address using a logical address, which is a hexadecimal number, and may access the memory device 1100 based on the generated physical address.

Figure 12:
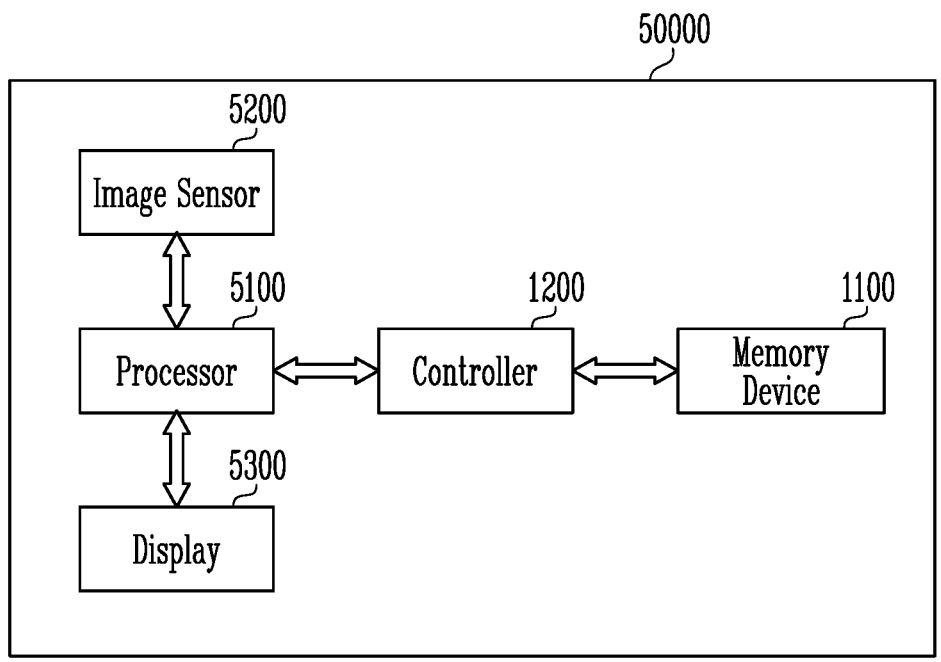
FIG. 12 is a diagram illustrating a memory system including a controller according to an embodiment of the present disclosure.

FIG. 12 is a diagram illustrating a memory system including a controller according to an embodiment of the present disclosure.

Referring to FIG. 12, a memory system 50000 may be implemented as an image processing device, for example, a digital camera, a smartphone provided with a digital camera, or a tablet PC provided with a digital camera.

The memory system 50000 may include a memory device 1100 and a controller 1200 which is capable of controlling a data processing operation of the memory device 1100, for example, a program operation, an erase operation or a read operation.

An image sensor 5200 of the memory system 50000 may convert an optical image into digital signals, and the converted digital signals may be transmitted to a processor 5100 or the controller 1200. Under the control of the processor 5100, the digital signals may be output via a display 5300 or may be stored in the memory device 1100 through the controller 1200. Further, data stored in the memory device 1100 may be output via the display 5300 under the control of the processor 5100 or the controller 1200.

In an embodiment, the controller 1200 capable of controlling the operation of the memory device 1100 may be implemented as a part of the processor 5100 or as a chip provided separately from the processor 5100.

When accessing the memory device 1100, the controller 1200 according to the present embodiment may generate a physical address using a logical address, which is a hexadecimal number, and may access the memory device 1100 based on the generated physical address.

Figure 13:
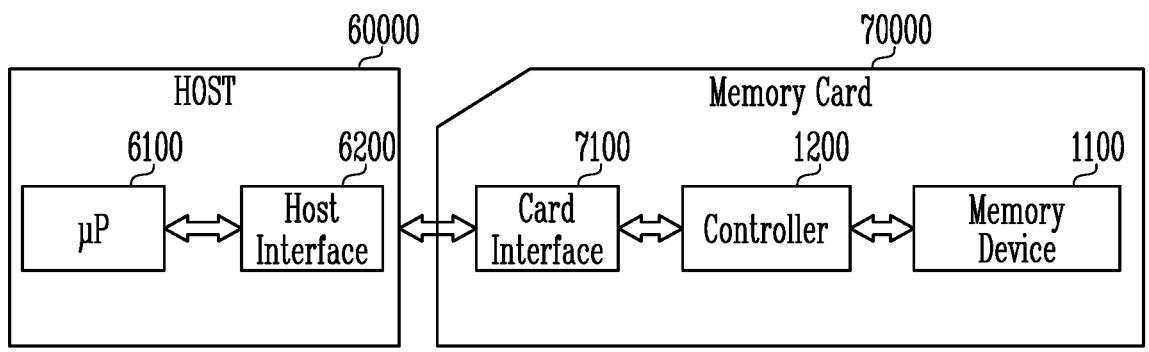
FIG. 13 is a diagram illustrating a memory system including a controller according to an embodiment of the present disclosure.

FIG. 13 is a diagram illustrating a memory system including a controller according to an embodiment of the present disclosure.

Referring to FIG. 13, a memory system 70000 may be implemented as a memory card or a smart card. The memory system 70000 may include a memory device 1100, a controller 1200, and a card interface 7100.

The controller 1200 may control data exchange between the memory device 1100 and the card interface 7100. When accessing the memory device 1100, the controller 1200 according to the present embodiment may generate a physical address using a logical address, which is a hexadecimal number, and may access the memory device 1100 based on the generated physical address.

The card interface 7100 may be, but is not limited to, a secure digital (SD) card interface or a multi-media card (MMC) interface.

The card interface 7100 may interface data exchange between a host 60000 and the controller 1200 according to a protocol of the host 60000. In an embodiment, the card interface 7100 may support a universal serial bus (USB) protocol and an interchip (IC)-USB protocol. Here, the card interface 7100 may refer to hardware capable of supporting a protocol which is used by the host 60000, software installed in the hardware, or a signal transmission method performed by the hardware.

When the memory system 70000 is coupled to a host interface 6200 of the host 60000 such as a PC, a tablet PC, a digital camera, a digital audio player, a mobile phone, console video game hardware or a digital set-top box, the host interface 6200 may perform data communication with the memory device 1100 through the card interface 7100 and the controller 1200 under the control of a microprocessor (μP) 6100.

Embodiments of the present disclosure may reduce the workload of a flash translation layer of a controller by changing a method of translating a logical address into a physical address.

What is claimed is:

1. A controller, comprising:
   a central processing unit configured to generate a command, manage a logical address using a notation system, a radix of which is greater than that of a binary notation system, and output the command and the logical address; and
   a flash interface layer configured to queue the command depending on workloads of dies, translate the logical address into a physical address, and output the command and the physical address through a selected channel.

2. The controller according to claim 1, wherein:
   the central processing unit is further configured to translate the logical address represented in the greater-radix notation system into the logical address represented in the binary notation system,
   the flash interface layer is further configured to translate the logical address represented in the binary notation system into the logical address represented in the greater-radix notation system, and
   the flash interface layer translates the logical address represented in the greater-radix notation system into the physical address including addresses of a die and a memory block.

3. The controller according to claim 2, wherein the central processing unit is further configured to queue the command depending on workloads of channels, and output the queued command and the logical address to the flash interface layer.

4. The controller according to claim 3, wherein the central processing unit comprises a flash translation layer configured to manage the logical address using the greater-radix notation, translate the logical address represented in the greater-radix notation system into the logical address represented in the binary notation system and output the logical address represented in the binary notation system.

5. A controller, comprising:
   a flash translation layer configured to:
   select a channel of a plurality of channels in consideration of workloads of the plurality of channels,
   manage logical addresses of memory blocks included in a plurality of dies coupled to the selected channel, the logical addresses being represented in a hexadecimal notation system and arranged in ascending order,
   translate the logical address represented in the hexadecimal notation system into the logical address represented in a binary notation system, and
   output the logical address of the binary notation system; and
   a flash interface layer configured to:
   translate the logical address represented in the binary notation system into the logical address of the hexadecimal notation system,
   generate a physical address of a selected die and memory block based on the logical address represented in the hexadecimal notation system, and
   output the physical address through the selected channel.

6. The controller according to claim 5, wherein the flash translation layer comprises:
   a hexadecimal number table configured to manage the logical addresses represented in the hexadecimal notation system; and
   a hexadecimal number to binary number (H2B) translation component configured to translate the logical address represented in the hexadecimal notation system into the logical address represented in a binary notation system, and then output the logical address represented in the binary notation system.

7. The controller according to claim 6, wherein the logical addresses stored in the hexadecimal number table are different from one another.

8. The controller according to claim 7, wherein:
   the logical addresses continuously increase from a first-located memory block within any of the dies, and
   the logical address of a first-located memory block in a next die discontinuously increases from the logical address of a last-located memory block in a previous die.

9. The controller according to claim 5, wherein the flash interface layer comprises a plurality of flash interfaces respectively coupled to the plurality of channels.

10. The controller according to claim 9, wherein:
    among the plurality of flash interfaces, a flash interface coupled to the selected channel is configured to receive the logical address represented in the binary notation system, and
    the flash interface having received the logical address outputs the physical address through the selected channel.

11. The controller according to claim 9, wherein each of the plurality of flash interfaces comprises:
    a command queue controller configured to queue received commands depending on workloads of the dies, and output the commands in a queuing order of the commands; and
    a logical to physical (L2P) translation component configured to translate the logical address represented in the hexadecimal notation system into the physical address and output the physical address.

12. A method of operating a controller, comprising:
managing addresses of memory blocks included in a plurality of dies, the addresses being represented in a hexadecimal notation system;
generating a logical address of the address corresponding to a selected one of the memory blocks within a selected one of the dies;
translating the logical address into the logical address represented in the hexadecimal notation system, and generating a physical address based on the logical address represented in the hexadecimal notation system, the physical address indicating the selected memory block within the selected die; and
accessing the selected memory block within the selected die according to the physical address.

13. The method according to claim 12, wherein the addresses represented in the hexadecimal notation system are arranged in an ascending order.

14. The method according to claim 12, wherein the generating of the logical address includes translating the address represented in the hexadecimal notation system into the logical address represented in a binary notation system.

* * * * *